(12) United States Patent
Heuer et al.

(10) Patent No.: US 7,968,671 B2
(45) Date of Patent: Jun. 28, 2011

(54) ALKYLPHENOL-TERMINATED COPOLYCARBONATES, PROCESSES FOR PREPARING THE SAME, MOLDING COMPOSITIONS CONTAINING THE SAME, AND ARTICLES PREPARED THEREFROM

(75) Inventors: Helmut-Werner Heuer, Krefeld (DE); Rolf Wehrmann, Krefeld (DE)

(73) Assignee: Bayer Material Science AG (DE)

( * ) Notice: Subject to any disclaimer, the term of this patent is extended or adjusted under 35 U.S.C. 154(b) by 1 day.

(21) Appl. No.: 12/466,644

(22) Filed: May 15, 2009

(65) Prior Publication Data
US 2009/0286953 A1    Nov. 19, 2009

(30) Foreign Application Priority Data

May 15, 2008    (DE) .......................... 10 2008 023 800

(51) Int. Cl.
*C08G 64/00* (2006.01)
*C08G 63/18* (2006.01)

(52) U.S. Cl. ..................... 528/204; 428/411.1; 428/412; 528/196; 528/198

(58) Field of Classification Search ............... 428/411.1, 428/412; 528/196, 198
See application file for complete search history.

(56) References Cited

U.S. PATENT DOCUMENTS

| | | | |
|---|---|---|---|
| 2,964,794 A | 12/1960 | Peilstöcker et al. | |
| 3,986,269 A | 10/1976 | Hancock | |
| 4,318,773 A | 3/1982 | Ullrich et al. | |
| 4,423,207 A | 12/1983 | Flock et al. | |
| 4,627,949 A | 12/1986 | Dhein et al. | |
| 4,631,338 A | 12/1986 | Meyer et al. | |
| 4,980,105 A | 12/1990 | Schmidt et al. | |
| 5,132,154 A | 7/1992 | Westeppe et al. | |
| 5,235,026 A | 8/1993 | Wulff et al. | |
| 5,306,803 A | 4/1994 | Arlt et al. | |
| 6,613,868 B2 | 9/2003 | Kauth et al. | |
| 6,710,154 B2 | 3/2004 | van Osselaer et al. | |
| 7,071,284 B2 | 7/2006 | Kauth et al. | |
| 2005/0250915 A1* | 11/2005 | Heuer et al. | .................. 525/462 |
| 2005/0288407 A1 | 12/2005 | Heuer et al. | |
| 2006/0135735 A1 | 6/2006 | Meyer et al. | |

FOREIGN PATENT DOCUMENTS

| | | |
|---|---|---|
| BE | 866991 | 11/1978 |
| DE | 1031507 | 6/1958 |
| DE | 1137167 | 9/1962 |
| DE | 1785137 A1 | 1/1972 |
| DE | 2053876 | 5/1972 |
| DE | 2701173 A1 | 7/1978 |
| DE | 3332065 A1 | 3/1985 |
| DE | 3429960 A1 | 2/1986 |
| DE | 3918406 A1 | 12/1990 |
| DE | 19962016 A1 | 1/2001 |
| DE | 102004022673 A1 | 11/2005 |
| EP | 0003996 A1 | 9/1979 |
| EP | 0089801 A1 | 9/1983 |
| EP | 0267025 A1 | 5/1988 |
| EP | 0411510 A2 | 2/1991 |
| EP | 0256003 B1 | 4/1991 |
| EP | 0460450 A2 | 12/1991 |
| EP | 0517044 A2 | 12/1992 |
| EP | 1249463 A2 | 10/2002 |
| EP | 1609818 A2 | 12/2005 |
| GB | 905072 | 9/1962 |
| GB | 1364310 | 8/1974 |
| GB | 1592724 | 7/1981 |
| WO | WO-99/55772 A1 | 11/1999 |
| WO | WO-01/51541 A1 | 7/2001 |
| WO | WO-2004/063249 A1 | 7/2004 |
| WO | WO-2006/072344 A1 | 7/2006 |

* cited by examiner

*Primary Examiner* — Terressa M Boykin
(74) *Attorney, Agent, or Firm* — Connolly Bove Lodge & Hutz LLP

(57) ABSTRACT

Copolycarbonates comprising alkylphenolchain terminator groups for adjusting the molecular weight, compositions of these copolycarbonates with additives chosen from the group of heat stabilizers and mold release agents, the use thereof for the production of moldings and moldings obtained therefrom.

15 Claims, No Drawings

ALKYLPHENOL-TERMINATED COPOLYCARBONATES, PROCESSES FOR PREPARING THE SAME, MOLDING COMPOSITIONS CONTAINING THE SAME, AND ARTICLES PREPARED THEREFROM

BACKGROUND OF THE INVENTION

Copolycarbonates belong to the group of industrial thermoplastics. They have diverse uses in the electrical and electronics sector, as a housing material for lamps and in uses where particular thermal and mechanical properties are required, for example hair driers, uses in the automobile sector, coverings of plastic, diffusing screens or light conductor elements and lamp coverings or lamp holders (bezels).

Good thermal and mechanical properties, such as Vicat temperature (heat distortion temperature) and glass transition temperature, are practically always necessarily required for these uses. In order to achieve the increased heat distortion temperature, specific bisphenols, which have an involved synthesis and are therefore also expensive, must be resorted to.

It is known that in the case of polymers these properties depend on the molecular weight. Generally, they increase with increasing molecular weight and approach a limit value. In this context, however, not only the molecular weight per se, but the molecular inhomogeneity factor $U=(Mw/Mn)-1$ is of importance. Large inhomogeneity factors can cause negative thermal and mechanical properties in copolycarbonates. The molecular weight furthermore has a direct influence on the viscosity (solution and melt viscosity) and therefore on the flowability of a polymer melt at a given processing temperature. However, high molecular weight products flow more poorly and can therefore be processed only with significantly shorter cycle times. This route is therefore not feasible for also fulfilling the necessary mechanical properties and heat distortion temperature at a relatively low molecular weight. Moreover, it is known, that low molecular weight compounds and oligomers can have a negative impact on thermal and mechanical properties of copolycarbonates.

Alkylphenols, in particular p-tert-butylphenol (also referred to hereinafter as "BUP" for simplification), as chain terminators for the preparation of polycarbonate are known (see, e.g., International Pat. Pub. No. WO 01/51541, European Pat. Pub. No. EP 1249463A and International Pat. Pub. No. WO 2004/063249, the entire contents of each of which is hereby incorporated herein by reference). However, the publications cited describe neither polycarbonates having a defined molecular weight distribution nor the use of alkylphenols for the preparation of copolycarbonates having a defined molecular weight distribution. In particular, no indication of the influence of the chain terminator on the molecular inhomogeneity factor in a given copolymer composition when phenol is used as the chain terminator nor on the Vicat temperature is to be found.

BRIEF SUMMARY OF THE INVENTION

The present invention relates, in general, to copolycarbonates having a narrow molecular weight distribution and compositions of these polycarbonates with additives chosen from the group of heat stabilizers and mold release agents, the use thereof for the production of moldings and moldings obtainable therefrom and the use of alkylphenols for adjusting the molecular weight of copolycarbonates.

Various embodiments of the present invention provide aromatic polycarbonates having an improved heat distortion temperature and methods for their preparation, at a given/defined viscosity (solution or melt viscosity), in a continuous process in which the content of low molecular weight compounds and oligomers is reduced, i.e. the inhomogeneity factor $U=(Mw/Mn)-1$ becomes smaller, and at the same time the thermal properties (Vicat and glass temperature) are improved and the amount of specific high $T_g$ bisphenol employed is lower.

It has surprisingly been found that alkylphenols which are employed as chain terminators in the preparation of polycarbonates according to various embodiments of the present invention have a decisive influence on the course of gel permeation chromatography (GPC) curves, i.e. on the molecular weight distribution, and therefore also on the content of low molecular weight compounds and oligomers which are to be avoided, and the Vicat temperature for a given copolymer composition can be increased. This measure for controlled improvement of the molecular weight distribution, i.e. narrower distribution or lower inhomogeneity factor $U=(Mw/Mn)-1$, and the adjustment thereof and dependency on the nature of the chain terminator in a continuous process by the interfacial process, was hitherto unknown. Moreover, it was found that the same high level Vicat- and glass temperature can be achieved with smaller amounts of the special high-$T_g$-Bisphenols if a narrower molecular weight distribution is provided, as in the present invention. At the same time, a lower melt viscosity and, hence an improved processing behavior of the resulting copolycarbonates in an injection molding process is obtained.

This represents an important criterion for the mechanical and thermal performance of the injection moulded or extruded component. Injection moulded parts or extrudates produced from the copolycarbonates and copolycarbonate compositions according to the invention have significantly improved thermal properties (glass transition temperature Tg and Vicat temperature).

The present invention provides copolycarbonates containing as a chain terminator (end group) a structural unit of the formula (1)

in which R1 and R2 independently of one another represent hydrogen or a $C_1$-$C_{18}$-alkyl, but wherein R1 and R2 cannot simultaneously be hydrogen, and at least one diphenol unit of the formula (2)

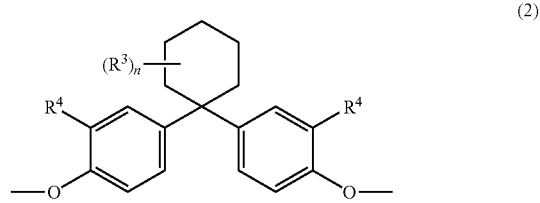

in which $R^3$ represents $C_1$-$C_4$-alkyl, preferably methyl, $R^4$ represents hydrogen or $C_1$-$C_4$-alkyl, preferably methyl, n represents 0, 1, 2 or 3, preferably 2 or 3, m represents 0, 1 or 2, preferably 0, wherein the copolycarbonates have the following inhomogeneity factors, depending on the molecular weight range:

A) copolycarbonates having a content of ≧50 mol % and of <100 mol % of diphenol unit of the formula (2), based on the sum of the diphenols: for linear copolycarbonates ("CoPC") having an average molecular weight (weight-average) of from 18,000 to 35,000 g/mol, U=(Mw/Mn)−1 is 1.3 to 2.5, preferably 1.4 to 2.3, very particularly preferably 1.5 to 2.3.

B) copolycarbonates having a content of greater than 0 and less than 50 mol % of diphenol unit of the formula (2), based on the sum of the diphenols: for linear CoPC having an average molecular weight (weight-average) of from 16,000 to 35,000 g/mol, U=(Mw/Mn)−1 is 1.2 to 2.4, preferably 1.2 to 2.2, particularly preferably 1.2 to 2.0 and very particularly preferably 1.2 to 1.8.

In formula (1), R1 and R2 independently of one another preferably represent hydrogen or alkyl having 1 to 8, particularly preferably having 1 to 4 carbon atoms, with the proviso that R1 and R2 are not simultaneously hydrogen. Tert-Butylphenol or n-butylphenol is very particularly preferred, in particular p-tert-butylphenol.

Thermoplastic aromatic polycarbonates in the context of the present invention include both homopolycarbonates and copolycarbonates; wherein in the context of the various embodiments of the present invention, homopolycarbonates from the diphenol unit of the formula (2) are also subsumed under the term copolycarbonate.

The thermoplastic copolycarbonates have the abovementioned molecular weights $M_w$ (weight-average Mw, determined by GPC measurement, polycarbonate calibration). Molecular weights can also be stated by the number-average Mn, which is likewise determined by means of GPC after prior calibration for polycarbonate.

The inhomogeneity factor U=(Mw/Mn)−1, as a measure of the molecular weight distribution of the copolycarbonates, can thus be determined for various molecular weight ranges.

One embodiment of the present invention includes copolycarbonates comprising: (i) a chain terminator structural unit of the formula (1):

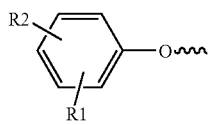

(1)

wherein R1 and R2 each independently represent hydrogen or a $C_{1-18}$-alkyl, with the proviso that R1 and R2 are not simultaneously hydrogen; and (ii) at least one diphenol unit of the formula (2)

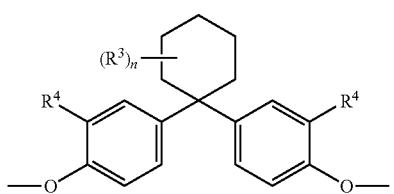

(2)

wherein $R^3$ represents a $C_{1-4}$-alkyl, $R^4$ represents hydrogen or $C_1$-$C_4$-alkyl, preferably methyl, and n represents 0, 1, 2 or 3; and wherein the copolycarbonates have an inhomogeneity factor of: A) 1.3 to 2.5, when the copolycarbonates have a content of ≧50 mol % and <100 mol % of the at least one diphenol unit of the formula (2), based on total diphenols, and have an average molecular weight (weight-average) of 18,000 to 35,000 g/mol; and B) 1.2 to 2.0, when the copolycarbonates have a content of greater than 0 and less than 50 mol % of the at least one diphenol unit of the formula (2), based on total diphenols, and have an average molecular weight (weight-average) of 16,000 to 35,000 g/mol.

Various embodiments of the present invention furthermore include compositions comprising:

(C) abovementioned copolycarbonate with alkylphenol of the formula (1) as an end group, wherein the inhomogeneity factor has the abovementioned values, depending on the molecular weight range, and (D) at least one additive chosen from the group consisting of heat stabilizer, mould release agent and UV stabilizer.

The compositions, in general, can comprise 0.001 to 1 wt. %, preferably 0.005 to 0.9, particularly preferably 0.005 to 0.8 wt. %, very particularly preferably 0.04 to 0.8 wt. %, and even more preferably 0.04 to 0.6 wt. % (based on the total composition) of additives according to component D).

Tris-(2,4-di-tert-butylphenyl)phosphite (Irgafos 168), Tetrakis(2,4-di-tert.-butylphenyl)[1,1biphenyl]-4,4'-diylbis-phosphonite, Trisoctylphosphat, Octadecyl-3-(3,5-di-tert butyl-4-hydroxyphenyl)propionat (Irganox 1076), Bis(2,4-dicumylphenyl)-pentaerythritoldiphosphite (Doverphos S-9228), Bis(2,6-di-tert.butyl-4-methyl-phenyl)pentaerythritoldiphosphite (ADK STAB PEP-36) or Triphenylphosphine are preferably suitable as heat stabilizer. They are employed by themselves or in a mixture (e.g. Irganox B900 or Doverphos S-92228 with Irganox B900 resp. Irganox 1076).

Pentaerythritol tetrastearate, glycerol monostearate, stearyl stearate or propanediol mono- or distearate are preferably suitable as the mould release agent. They are employed by themselves or in a mixture.

2-(2'-Hydroxyphenyl)benzotriazoles, 2-hydroxybenzophenones, esters of substituted and unsubstituted benzoic acids, acrylates, sterically hindered amines, oxamides and 2-(2-hydroxyphenyl)-1,3,5-triazines are preferably suitable as UV stabilizers, and substituted benzotriazoles are particularly preferred.

Other various embodiments of the present invention include methods of forming molded and/or extruded articles using copolycarbonates and/or compositions containing such according to the present invention.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a diphenol" herein or in the appended claims can refer to a single diphenol or more than one diphenol. Additionally, all numerical values, unless otherwise specifically noted, are understood to be modified by the word "about."

Copolycarbonates according to the various embodiments of the invention can be prepared by a continuous interfacial process. The preparation of the copolycarbonates to be used according to the invention is in principle carried out in a known manner from diphenols, carbonic acid derivatives and optionally branching agents.

Processes for polycarbonate synthesis are generally known and are described in numerous publications. For example, EP-A 0 517 044, WO 2006/072344, EP-A 1 609 818, WO 2006/072344 and EP-A 1 609 818, the entire contents of each of which are hereby incorporated herein by reference, describe the interfacial and the melt process for the preparation of polycarbonate.

However, it cannot be deduced from the prior art what measures must already be taken during the synthesis in order to obtain a polycarbonate having a very good notched impact strength and improved heat distortion temperature in a continuous process. In particular, no indication of the influence of the chain terminator on the inhomogeneity factor U was known.

In a continuous process for the preparation of aromatic polycarbonates or copolycarbonates having a relatively narrow molecular weight distribution by the so-called interfacial process, according to various embodiments of the present invention, the phosgenation of a disodium salt of a mixture of various bisphenols initially introduced into the reaction vessel in an aqueous alkaline solution (or suspension) is carried out in the presence of an inert organic solvent or, preferably, a solvent mixture, which forms a second phase. The oligocarbonates formed, which are chiefly present in the organic phase, undergo condensation with the aid of suitable catalysts to give copolycarbonates having the desired molecular weight dissolved in the organic phase. The organic phase is finally separated off and the copolycarbonate is isolated therefrom by various working up steps, preferably by a devolatilization extruder or extrusion evaporator. The decisive step for acquiring products having an improved heat distortion temperature consists of carrying out this continuous process such that the narrowest possible molecular weight distribution of the polycarbonate, i.e. a low inhomogeneity factor, is already obtained during the synthesis and without specific working up, such as e.g. precipitation or spray evaporation. This is achieved according to the invention by the suitable choice of the chain terminator, which leads to a lower inhomogeneity factor.

Apart from the diphenols of the formula (2), dihydroxyaryl compounds which are suitable for the preparation of the copolycarbonates are those of the formula (3)

$$HO-Z-OH \quad (3)$$

in which Z is an aromatic radical having 6 to 30 C atoms, which can contain one or more aromatic nuclei, can be substituted and can contain aliphatic or cycloaliphatic radicals or alkylaryls or hetero atoms as bridge members.

Preferably, in formula (3) Z represents a radical of the formula (3 a)

(3a)

in which $R^6$ and $R^7$ independently of one another represent H, $C_1$-$C_{18}$-alkyl, $C_1$-$C_{18}$-alkoxy, halogen, such as Cl or Br, or in each case optionally substituted aryl or aralkyl, preferably H or $C_1$-$C_{12}$-alkyl, particularly preferably H or $C_1$-$C_8$-alkyl and very particularly preferably H or methyl, and X represents —$SO_2$—, —CO—, —O—, —S—, $C_1$— to $C_6$-alkylene, $C_2$— to $C_5$-alkylidene or $C_6$— to $C_{12}$-arylene, which can optionally be condensed with further aromatic rings containing hetero atoms.

Preferably, X represents $C_1$ to $C_5$-alkylene, $C_2$ to $C_5$-alkylidene, —O—, —SO—, —CO—, —S—, —$SO_2$—, isopropylidene or oxygen, in particular isopropylidene.

For the preparation of the copolycarbonates according to the invention, 1,1-bis-(4-hydroxyphenyl)-3,3,5-trimethylcyclohexane (bisphenol TMC) and 1,1-bis-(3-methyl-4-hydroxyphenyl)-3,3,5-trimethyloyclohexane (dimethyl TMC) are preferred as a diphenol derived from formula (2).

Diphenols of the formula (3) which are suitable for the preparation of the copolycarbonates to be used according to the invention are, for example, hydroquinone, resorcinol, bis-(hydroxyphenyl)-alkanes, bis-(hydroxyphenyl)sulfides, bis-(hydroxyphenyl)ethers, bis-(hydroxyphenyl)ketones, bis-(hydroxyphenyl)sulfones, bis-(hydroxyphenyl)sulfoxides, α,α'-bis-(hydroxyphenyl)-diisopropylbenzenes, and alkylated, nucleus-alkylated and nucleus-halogenated compounds thereof.

Preferred diphenols are 4,4'-dihydroxydiphenyl, 2,2-bis-(4-hydroxyphenyl)-1-phenylpropane, 1,1-bis-(4-hydroxyphenyl)-phenylethane, 2,2-bis-(4-hydroxyphenyl)-propane, 2,2-bis-(3-methyl-4-hydroxyphenyl)-propane, 2,4-bis-(4-hydroxyphenyl)-2-methylbutane, 1,3-bis-[2-(4-hydroxyphenyl)-2-propyl]-benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)sulfone, 2,4-bis-(3,5-dimethyl-4-hydroxyphenyl)-2-methylbutane and 1,3-bis-[2-(3,5-dimethyl-4-hydroxyphenyl)-2-propyl]-benzene.

Particularly preferred diphenols are 2,2-bis-(4-hydroxyphenyl)-propane (BPA) and 2,2-bis-(3-methyl-4-hydroxyphenyl)-propane (dimethyl BPA).

Copolycarbonates from bisphenol A and bisphenol TMC and copolycarbonates from dimethyl BPA and bisphenol TMC or BPA and dimethyl TMC are particularly preferred.

These and further suitable diphenols are commercially obtainable and are described e.g. in "H. Schnell, Chemistry and Physics of Polycarbonates, Interscience Publishers, New York 1964, p. 28 et seq.; p. 102 et seq.", and in "D. G. Legrand, J. T. Bendler, Handbook of Polycarbonate Science and Technology, Marcel Dekker New York 2000, p. 72 et seq.".

Random copolycarbonates having the following structure:

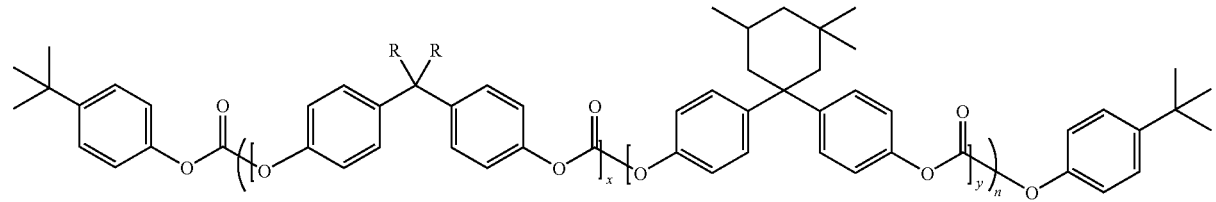

wherein R represents $C_1$-$C_6$-alkyl, preferably $C_1$-$C_4$-alkyl, x and y characterize the mol % of the bisphenols employed and therefore the sum of x+y=1 and x and y independently of one another denote values of from 0 to 1, preferably 0.01 to 0.99, particularly preferably 0.02 to 0.98, very particularly preferably from 0.03 to 0.97, and n is determined by the molecular weight, are particularly preferred.

Random copolycarbonates having the following structure:

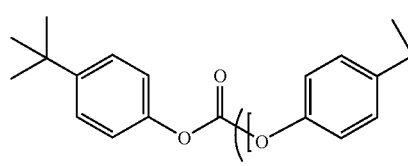 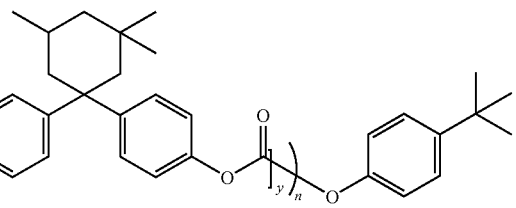

wherein R denotes methyl and x and y denote values of from 0 to 1, preferably 0.01 to 0.99, particularly preferably from 0.02 to 0.98, very particularly preferably from 0.03 to 0.97, are very particularly preferred.

The thermoplastic copolycarbonates, including the thermoplastic aromatic polyester carbonates, have molecular weights $M_w$ (weight-average Mw, determined by gel permeation chromatography GPC measurement) of from 12,000 to 120,000, preferably from 15,000 to 80,000, in particular from 18,000 to 60,000, very particularly preferably from 18,000 to 40,000 g/mol. Molecular weights can also be stated by the number-average Mn, which is likewise determined by means of GPC after prior calibration for polycarbonate.

The diphenols used, like all the other chemicals and auxiliary substances added to the synthesis, may be contaminated with impurities originating from their own synthesis, handling and storage. However, it is desirable to work with raw materials which are as pure as possible.

An aqueous phase of NaOH, one or more bisphenols and water is used in this process, it being possible for the concentration of this aqueous solution with respect to the sum of the bisphenols, calculated not as the sodium salt but as the free bisphenol, to vary between 1 and 30 wt. %, preferably between 3 and 25 wt. %, particularly preferably between 3 and 8 wt. % for polycarbonates having an Mw>45,000 and 12 to 22 wt. % for polyearbonates having an Mw<45,000. In this context, at higher concentrations it may be necessary to heat the solutions. The sodium hydroxide used to dissolve the bisphenols can be used as a solid or as aqueous sodium hydroxide solution. The concentration of the sodium hydroxide solution depends on the target concentration of the required bisphenolate solution, but as a rule is between 5 and 25 wt. %, preferably 5 and 10 wt. %, or a higher concentration is chosen and the solution is subsequently diluted with water. In the process with subsequent dilution, sodium hydroxide solutions having concentrations of between 15 and 75 wt. %, preferably 25 and 55 wt. %, optionally heated, are used. The alkali content per mol of bisphenol depends greatly on the structure of the bisphenol, but as a rule varies between 0.25 mol of alkali/mol of bisphenol and 5.00 mol of alkali/mol of bisphenol, preferably 1.5-2.5 mol of alkali/mol of bisphenol. The bisphenols can be dissolved together. However, it may be advantageous to dissolve the bisphenols separately in an optimum alkaline phase and to meter the solutions separately or to feed them to the reaction in combined form. It may furthermore be advantageous to dissolve the bisphenol or bisphenols not in sodium hydroxide solution but in dilute bisphenolate solution provided with additional alkali. The dissolving operations can start from solid bisphenol, usually in flakes or prill form, or also from molten bisphenol. The sodium hydroxide employed or the sodium hydroxide solution can have been prepared by the amalgam process or the so-called membrane process. Both processes have been used for a long time and are familiar to the person skilled in the art. Sodium hydroxide solution from the membrane process is preferably used.

The aqueous phase prepared in this way is phosgenated together with an organic phase comprising solvents for polycarbonate which are inert towards the reactants and form a second phase.

The metering of bisphenol optionally practised after or during the introduction of phosgene can be carried out for as long as phosgene or its direct secondary products, the chlorocarbonic acid esters, are present in the reaction solution.

The synthesis of copolycarbonates from bisphenols and phosgene in an alkaline medium is an exothermic reaction and is carried out in a temperature range of from −5° C. to 100° C., preferably 15° C. to 80° C., very particularly preferably 25-65° C., it being necessary, where appropriate, to work under increased pressure, depending on the solvent or solvent mixture.

The organic phase can comprise one or mixtures of several solvents, mixtures being preferred. Suitable solvents are chlorinated hydrocarbons (aliphatic and/or aromatic), preferably methylene chloride, trichloroethylene, 1,1,1-trichloroethane, 1,1,2-trichloroethane and chlorobenzene and mixtures thereof. However, aromatic hydrocarbons, such as benzene, toluene or m/p/o-xylene, or aromatic ethers, such as anisole, by themselves, in a mixture or additionally to or in a mixture with chlorinated hydrocarbons, can also be used. Another embodiment of the synthesis uses solvents which do not dissolve but only swell polycarbonate. Non-solvents for polycarbonate in combination with solvents can therefore also be used. In this case, solvents which are soluble in the aqueous phase, such as tetrahydrofuran, 1,3/1,4-dioxane or 1,3-dioxolane, can also be used as solvents if the solvent partner forms the second organic phase. However, mixtures of methylene chloride and chlorobenzene having a mixture ratio (weight ratio) of from 60:40 to 55:45 are preferred.

The two phases which form the reaction mixture are mixed in order to accelerate the reaction. This is effected by introduction of energy via shear forces, i.e. pumps or stirrers, or by static mixers or by generation of turbulent flow by means of nozzles and/or diaphragms. Combinations of these measures are also used, often also repeatedly in a sequence of time or apparatus. Anchor, propeller and MIG stirrers etc., such as are described e.g. in Ullmann, "Encyclopedia of Industrial Chemistry", 5th edition, vol. B2, p. 251 et seq., are preferably employed as stirrers. Centrifugal pumps, often also multistage, 2- to 9-stage pumps being preferred, are employed as pumps. Nozzles and/or diaphragms which are employed are perforated diaphragms or pipe pieces narrowed at the position thereof or also Venturi or Lefos nozzles.

The phosgene can be introduced in gaseous or liquid form or dissolved in a solvent. The excess of phosgene used, based on the sum of the bisphenols employed, is between 3 and 100 mol %, preferably between 5 and 50 mol %. In this case, the pH of the aqueous phase is kept in the alkaline range, preferably between 8.5 and 12, during and after the metering of phosgene via topping up of sodium hydroxide solution once or several times or corresponding topping up of bisphenolate solution, while it should preferably be 10 to 14 after the addition of catalyst. The temperature during the phosgenation is 25 to 85° C., preferably 35 to 65° C., it also being possible to work under increased pressure, depending on the solvent used.

The metering of phosgene can take place directly into the mixture of organic and aqueous phase described, or also completely or partly, before mixing of the phases, into one of the two phases, which is subsequently mixed with the corresponding other phase. The phosgene can furthermore be metered completely or partly into a recycled part stream of the synthesis mixture of two phases, this part stream preferably being recycled before addition of the catalyst. In another embodiment, the aqueous phase described is mixed with the organic phase containing the phosgene and then added to the abovementioned recycled part stream after a dwell time of from 1 second to 5 min, preferably 3 seconds to 2 minutes, or the two phases, the aqueous phase described with the organic phase containing the phosgene, are mixed directly in the abovementioned recycled part stream. In all these embodiments, the pH ranges described above are to be observed and if appropriate maintained by topping up of sodium hydroxide solution once or several times or corresponding topping up of bisphenolate solution. The temperature range must likewise be maintained, where appropriate by cooling or dilution.

The copolycarbonate synthesis is carried out continuously. The reaction can therefore be carried out in pumped circulation reactors, tube reactors or stirred tank cascades or combinations thereof where it is to be ensured, by using the mixing organs already mentioned, that the aqueous and organic phase as far as possible only demix when the synthesis mixture has reacted completely, i.e. no longer contains hydrolysable chlorine from phosgene or chlorocarbonic acid esters.

The monofunctional chain terminators of the formula 1 or mixtures thereof required for regulation of the molecular weight, as such or in the form of their chlorocarbonic acid esters, either are fed to the reaction with the bisphenolate or the bisphenolates, or are added at any desired point in time of the synthesis, as long as phosgene or chlorocarbonic acid end groups are still present in the reaction mixture or, in the case of the acid chlorides and chlorocarbonic acid esters as chain terminators, as long as sufficient phenolic end groups of the polymer formed are available. Preferably, however, the chain terminator or terminators are added after the phosgenation at a site or at a point in time where phosgene is no longer present, but the catalyst has not yet been metered, or they are metered before the catalyst, together with the catalyst or parallel therewith.

The amount of chain terminators to be employed is 0.5 mol % to 10 mol %, preferably 1 mol % to 8 mol %, particularly preferably 2 mol % to 6 mol %, based on the moles of the particular diphenols employed. The addition of the chain terminators can be carried out before, during or after the phosgenation, preferably as a solution in a solvent mixture of methylene chloride and chlorobenzene (8-15 wt. % strength).

The catalysts used in the interfacial synthesis are tertiary amines, in particular triethylamine, tributylamine, trioctylamine, N-ethylpiperidine, N-methylpiperidine or N-i/n-propylpiperidine, particularly preferably triethylamine and N-ethylpiperidine. The catalysts can be added to the synthesis individually, in a mixture or also side by side and successively, optionally also before the phosgenation, but meterings after the introduction of phosgene are preferred. Metering of the catalyst or catalysts can be carried out in substance, in an inert solvent, preferably that of the polycarbonate synthesis, or also as an aqueous solution, in the case of the tertiary amines then as ammonium salts thereof with acids, preferably mineral acids, in particular hydrochloric acid. If several catalysts are used or part amounts of the total amount of the catalyst are metered, it is of course also possible to carry out different methods of metering at various sites or various times. The total amount of catalysts used is between 0.001 to 10 mol %, based on the moles of bisphenols employed, preferably 0.01 to 8 mol %, particularly preferably 0.05 to 5 mol %.

After introduction of the phosgene, it may be advantageous to thoroughly mix the organic phase and the aqueous phase for a certain time before, where appropriate, the branching agent, if this is not metered together with the bisphenolate, chain terminator and catalyst are added. Such an after-reaction time may be advantageous after each metering. These after-stirring times, if they are inserted, are between 10 seconds and 60 minutes, preferably between 30 sec and 40 minutes, particularly preferably between 1 and 15 min. These then take place in dwell reactors.

The at least two-phase reaction mixture which has reacted completely and contains at most traces (<2 ppm) of chlorocarbonic acid esters is allowed to settle for separation of the phases. The aqueous alkaline phase may be passed completely or partly back into the polycarbonate synthesis as aqueous phase, or is fed to waste water treatment, where solvent and catalyst contents are separated off and recycled. In another variant of the working up, after the organic impurities, in particular solvents and polymer residues, have been separated off and optionally after adjustment to a certain pH, e.g. by addition of sodium hydroxide solution, the salt is separated off, and e.g. can be fed to chlor-alkali electrolysis, while the aqueous phase is optionally fed back to the synthesis.

The organic phase containing the polymer must now be purified from all contamination of an alkaline, ionic or catalytic nature.

Even after one or more settling operations, optionally assisted by flows through settling tanks, stirred tanks, coalescers or separators or combinations of these measures—it being possible for water optionally to be metered into each or some of the separating steps, under certain circumstances using active or passive mixing organs—the organic phase still contains contents of the aqueous alkaline phase in fine droplets and the catalyst, as a rule a tertiary amine.

After this coarse separating off of the alkaline aqueous phase, the organic phase is washed once or several times with dilute acids, mineral, carboxylic, hydroxycarboxylic and/or sulfonic acids. Aqueous mineral acids, in particular hydrochloric acid, phosphorous acid and phosphoric acid or mixtures of these acids are preferred. The concentration of these acids should be in the range of 0.001 to 50 wt. %, preferably 0.01 to 5 wt. %.

The organic phase is furthermore washed repeatedly with desalinated or distilled water. The organic phase, where appropriate dispersed with parts of the aqueous phase, is separated off after the individual washing steps by means of settling tanks, stirred tanks, coalescers or separators or combinations of these measures, it being possible for the wash water to be metered between the washing steps, optionally using active or passive mixing organs.

Acids, preferably dissolved in the solvent on which the polymer solution is based, can optionally be added between these washing steps or also after the washing. Preferably, hydrogen chloride gas and phosphoric acid or phosphorous acid, which can optionally also be employed as mixtures, are used here.

After the last separating operation, the purified polymer solution obtained in this way should contain not more than 5 wt. %, preferably less than 1 wt. %, very particularly preferably less than 0.5 wt. % of water.

The polymer can be isolated from the solution by evaporation of the solvent by means of heat, vacuum or a heated entraining gas.

If the concentration of the polymer solution and where appropriate also the isolation of the polymer are carried out by distilling off the solvent, optionally by superheating and letting down, a "flash process" is referred to, see also "Thermische Trennverfahren", VCH Verlagsanstalt 1988, p. 114; if instead of this a heated carrier gas is sprayed together with the solution to be evaporated, "spray evaporation/spray drying" is referred to, described by way of example in Vauck, "Grundoperationen chemischer Verfahrenstechnik", Deutscher Verlag für Grundstoffindustrie 2000, 11th edition, p. 690. All these processes are described in the patent literature and in textbooks and are familiar to the person skilled in the art.

In the removal of the solvent by heat (distilling off) or the industrially more effective flash process, highly concentrated polymer melts are obtained. In the known flash process, polymer solutions are repeatedly heated under slightly increased pressure to temperatures above the boiling point under normal pressure, and these solutions, which are superheated with respect to normal pressure, are then let down into a vessel under a lower pressure, e.g. normal pressure. In this context it may be advantageous not to allow the concentration stages, or in other words the heating stages of the superheating, to become too great, but preferably to choose a two- to four-stage process.

The residues of the solvent can be removed from the highly concentrated polymer melts obtained in this way either directly from the melt using devolatilization extruders (BE-A 866 991, EP-A 0 411 510, U.S. Pat. No. 4,980,105, DE-A 33 32 065), thin film evaporators (EP-A 0 267 025), falling film evaporators or extrusion evaporators or by friction compacting (EP-A 0 460 450), optionally also with the addition of an entraining agent, such as nitrogen or carbon dioxide, or using vacuum (EP-A 0 039 96, EP-A 0 256 003, U.S. Pat. No. 4,423,207), or alternatively also by subsequent crystallization (DE-A 34 29 960) and thorough heating of the residues of the solvent in the solid phase (U.S. Pat. No. 3,986,269, DE-A 20 53 876).

Granules are obtained, if possible, by direct spinning of the melt and subsequent granulation, or by using melt extruders, from which spinning is carried out in air or under liquid, usually water. If extruders are used, additives can be added to the melt, before this extruder, optionally using static mixers, or through side extruders in the extruder.

Cooling, spinning, granulation and subsequent transportation or conveying of the granules with gas or liquid, and subsequent storage, optionally after a thorough mixing or homogenizing process, are to be configured such that as far as possible, in spite of the static charge possibly present, no impurities are applied to the polymer, strand or granule surface, such as, for example, dust, abraded material from the machines, aerosol-like lubricants and other liquids, as well as salts from water baths or cooling systems possibly used.

The materials obtained in this way are, as described for spray evaporation, processed to granules and optionally provided with additives.

The addition of additives serves to prolong the duration of use or the colour (stabilizers), to simplify the processing (e.g. mould release agents, flow auxiliaries, antistatics) or to adapt the polymer properties to exposure to certain stresses (impact modifiers, such as rubbers; flameproofing agents, colouring agents, glass fibres).

These additives can be added to the polymer melt individually or in any desired mixtures or several different mixtures, and in particular directly during isolation of the polymer or after melting of granules in a so-called compounding step. In this context, the additives or mixtures thereof can be added to the polymer melt as a solid, that is to say as a powder, or as a melt. Another type of metering is the use of masterbatches or mixtures of masterbatches of the additives or additive mixtures.

Suitable additives are described, for example, in "Additives for Plastics Handbook, John Murphy, Elsevier, Oxford 1999", in the "Plastics Additives Handbook, Hans Zweifel, Hanser, Munich 2001" or in WO 99/55772, p. 15-25.

Conventional additives are, for example, fillers, UV stabilizers, heat stabilizers which differ from component B), antistatics, pigments, mould release agents which differ from component B), flow auxiliaries and flameproofing agents. For example, alkyl and aryl phosphites, phosphates or -phosphanes, low molecular weight carboxylic acid esters, halogen compounds, salts, chalk, quartz flour and glass and carbon fibres and combinations thereof can be employed.

Colouring agents, such as organic dyestuffs or pigments, or inorganic pigments, IR absorbers, individually, in a mixture or also in combination with stabilizers, glass (hollow) beads, inorganic fillers or organic or inorganic scattering pigments can furthermore be added.

The polycarbonates and polycarbonate compositions according to the invention can be processed in the conventional manner on conventional machines, for example on extruders or injection moulding machines, to give any desired shaped articles, or mouldings to give films or sheets or bottles.

The polycarbonates having a narrow molecular weight distribution according to the present invention which are obtainable in this way and polycarbonate compositions obtainable therefrom can be employed for the production of extrudates (sheets, films and laminates thereof; e.g. for card uses and tubes) and shaped articles (bottles), in particular those for use in the transparent sector, especially in the field of optical uses, such as e.g. sheets, multi-wall sheets, glazing, diffusing or covering screens, lamp coverings, covering screens of plastic, light conductor elements or optical data storage media, such as audio CD, CD-R(W), DVD, DVD-R(W), minidisks in their various only readable or once-writable and optionally also rewritable embodiments, and data carriers for near-field optics. Furthermore for the production of objects for the E/E and IT sector.

The polycarbonate compositions are used in particular for the preparation of compounds, blends and components in which thermal and mechanical properties are utilized, such as, for example, housings, objects in the E/E sector, such as plugs, switches, panels and lamp holders and coverings, the automobile sector, such as lamp holders and coverings and glazing, the medical sector, such as dialysers, connectors and taps, and packaging, such as bottles and containers.

The present application likewise provides the extrudates and shaped articles or mouldings from the polymers according to the invention.

Further possible uses of the polycarbonate moulding compositions according to the invention are safety screens, which are known to be required in many areas of buildings, vehicles and aircraft, and as shields for helmets. Production of extruded and solvent films for displays or electric motors, also ski foils. Production of blow mouldings, such as water bottles (see, for example, U.S. Pat. No. 2,964,794). Production of transparent sheets, in particular hollow sheets, for example for covering buildings, such as stations, greenhouses and lighting installations. For the production of traffic light housings or traffic signs. For the production of foams (see, for example, DE-B 1 031 507). For the production of filaments and wires (see, for example, DE-B 1 137 167 and DE-A 1 785 137). As translucent plastics with a content of glass fibres for lighting purposes (see, for example, DE-A 1 554 020). For the production of small precision injection mouldings, such as, for example, lens holders. For this, polycarbonates having a content of glass fibres which optionally additionally contain about 1 to 10 wt. % of $MoS_2$, based on the total weight, are used. Optical uses, such as optical storage media (CD, DVD), safety glasses or lenses for photographic and film cameras (see, for example, DE-A 2 701 173). Light transmitters, in particular as light conductor cables (see, for example, EP-A1 0 089 801). As electrical insulation materials for electrical conductors and for plug housings and plug connectors. As carrier material for organic photoconductors. For the production of lamps, e.g. searchlights, as so-called "head-lamps" or scattered light screens or lamp coverings. For medical uses, e.g. oxygenators, dialysers. For foodstuffs uses, such as e.g. bottles, tableware and chocolate moulds. For uses in the automobile sector where contact with fuels and lubricants may occur. For sports articles, such as e.g. slalom poles. For household articles, such as e.g. kitchen sinks and letterbox housings. For housings, such as e.g. electrical distribution cabinets, electrical equipment, domestic appliances, components of household articles, electrical and electronic equipment. For the production of motor cycle and safety helmets. Automobile components, such as glazing, dashboards, vehicle body components and shock absorbers. For other uses, such as e.g. fattening stable doors or animal cages.

The invention will now be described in further detail with reference to the following non-limiting examples.

EXAMPLES

Examples 1 to 3

Preparation of Copolycarbonates from Bisphenol A and Bisphenol TMC

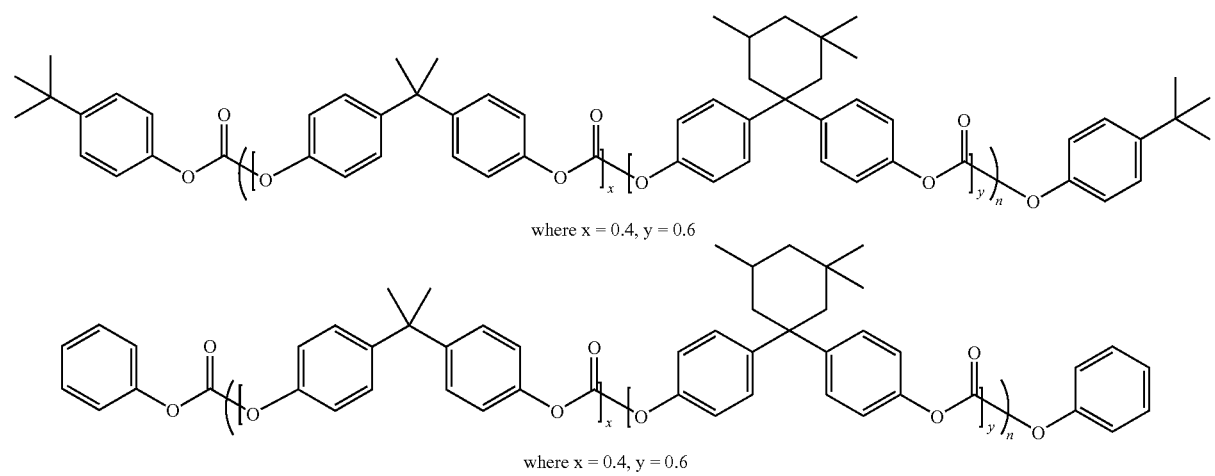

where x = 0.4, y = 0.6 where x = 0.4, y = 0.6

Various copolycarbonates each with different molecular weight distributions were prepared by varying the chain terminator in a continuous interfacial process (see Table 1). The composition of the comonomers is in all cases the bisphenols BPA to bisphenol TMC in the weight ratio of 33 to 67% by weight (i.e. molar ratio of 40 to 60 mol %).

The reaction is conducted continuously in an emulsion comprising a solvent mixture, composed of 50.0 wt. % of methylene chloride and 50.0 wt. % of chlorobenzene, and water. P-tert-Butylphenol (BUP) and phenol (PHE) are employed as chain terminators. N-Ethylpiperidine (EPP) is used as the catalyst. The continuous reaction is operated until adequate amounts of the polycarbonate solution collected have formed. This polycarbonate solution formed, after the aqueous phase has been separated off, is washed under acidic conditions with hydrochloric acid, and then washed under neutral conditions until free from salts with completely desalinated water by means of disc separators. The polycarbonate solutions washed in this way are concentrated to a concentration of 60-70 wt. % of polycarbonate in a multistage thermal pre-evaporation. The residual solvent is evaporated off via a devolatilization extruder and the resulting polycarbonate is obtained as a melt strand which, after cooling in a water-bath, was fed to a granulation.

The following reaction conditions were implemented (figures in % are % by weight, unless stated otherwise).

Na bisphenolate solution: throughput mixture of 1.270 kg/h of bisphenol A and 2.59 kg/h of bisphenol TMC in aqueous alkaline solution, concentration 15.0%,; 2.3 mol of NaOH per one mol of bisphenol mixture; throughput therefore 25.75 kg/h of bisphenolate solution Phosgene: 1.789 kg/h (dissolved in the solvent mixture)

Solvent mixture: 24.38 kg/h sodium hydroxide solution topped up (after the pumped circulation reactor): 1.27 kg/h; concentration 46.7%

Chain terminator: 69.61 g/h of BUP, or 39.18 g/h of PHE
Catalyst EPP: 15.75 g/h; (3% in the solvent mixture)
Phosgene: 130 mol %, based on the total substance amount of bisphenol
EPP: 1.0 mol %, based on the total substance amount of bisphenol
BUP or PHE: 3.3 mol %, based on the total substance amount of bisphenol
Reaction temperature: 33° C.
Polycarbonate concentration: 15.0%
V number (viscosity number): 26.0±0.05
3-stage procedure In the series of experiments, the influence of the chain terminator under otherwise identical reaction conditions was investigated. The chain terminator was added such that the target viscosity (or V number) was reached.

The following continuous reaction conditions were realized, the polycarbonates according to Examples 1 to 3 being prepared under the abovementioned reaction conditions. The chain terminators used can be seen from Table 1.

TABLE 1

| Example | Solvent | Chain terminator | Catalyst |
|---|---|---|---|
| 1 | SM | BUP | EPP |
| 2 | SM | BUP | EPP |
| 3 | SM | PHE | EPP |

MC: methylene chloride
MCB: chlorobenzene
SM: solvent mixture (50% MC:50% MCB)
BUP: para-tert-butylphenol
PHE: phenol
EPP: ethylpiperidine The Tg is determined in accordance with ISO 11357, the HDT in accordance with DIN ISO 306. The relative solution viscosity eta rel is determined in methylene chloride (0.5 g of polycarbonate/l) at 25° C. The melt volume rate is determined in accordance with ISO 1133.

The polycarbonates listed in Table 2 with the following properties were obtained here:

Comparison of the copolycarbonates PC-1 and PC-2 according to the invention (copolycarbonates from the bisphenols BPA and TMC in the weight ratio of 33 to 67% by weight (molar ratio of 40 to 60 mol %) with tert-butylphenol as the chain terminator shows a significantly lower inhomogeneity factor U than the phenol-terminated copolycarbonate PC-3 (BPA/TMC, weight ratio likewise 33 to 67 wt. %). With the same MVR (melt volume ratio) and therefore identical processing properties in the injection moulding process, significantly increased glass transition and Vicat temperatures are obtained, which corresponds to an improvement in the heat distortion temperature.

Conversely, the same thermal and mechanical properties can already be achieved with the process according to the invention with less of the expensive bisphenol TMC unit. The bisphenol BPA to TMC ratio can thus be shifted more in the direction of the less expensive bisphenol SPA.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. Copolycarbonates comprising: (i) a chain terminator structural unit of the formula (1):

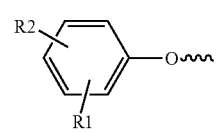

(1)

wherein R1 and R2 each independently represent hydrogen or a $C_{1-18}$-alkyl, with the proviso that R1 and R2 are not simultaneously hydrogen; (ii) at least one diphenol unit of the formula (2)

TABLE 2

|  |  | PC1 | PC2 | PC3 (comparison) |
|---|---|---|---|---|
| Chain terminator |  | BUP | BUP | phenol |
| Hydrolysable chlorine | ppm | 0.6 | 0.8 | 0.4 |
| Phenolic OH | ppm | 80 | 50 | 60 |
| Tg 2nd heating | ° C. | 207.2 | 208.9 | 205.5 |
| GPC - Mw | g/mol | 30,135 | 29,220 | 30,292 |
| GPC - Mn | g/mol | 10,776 | 9,716 | 9,515 |
| GPC - U |  | 1.8 | 2.01 | 2.18 |
| Relative viscosity 25° C. |  | 1.264 | 1.258 | 1.262 |
| MVR 330° C./2.16 kg | ml/10 min | 6.5 | 6.5 | 6.5 |
| IMVR 20' 330° C./2.16 kg | ml/10 min | 6.5 | 6.7 | 6.3 |
| Delta MVR/IMVR 20' |  | 0.0 | 0.2 | −0.2 |
| Vicat VST B50 | ° C. | 204.1 | 205.2 | 201.3 |
| Vicat VST B120 | ° C. | 204.9 | 205.6 | 201.5 |
| Notched impact strength ISO 180/4A at room temperature RT | kJ/m² | 7s | 7s | 7s |

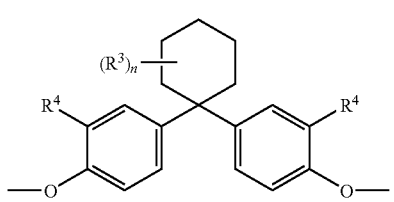

(2)

wherein $R^3$ represents a $C_{1-4}$-alkyl, $R^4$ represents hydrogen or $C_1$-$C_4$-alkyl, and n represents 0, 1, 2 or 3; and (iii) at least one dihydroxyaryl compound of the formula (3)

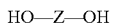

(3)

wherein Z represents a radical of the formula (3a)

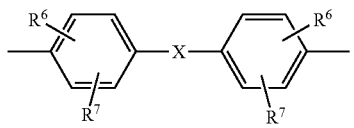

(3a)

wherein each $R^6$ and each $R^7$ independently represents a moiety selected from the group consisting of H, $C_1$-$C_{18}$-alkyls, $C_1$-$C_{18}$-alkoxys, halogens, optionally substituted aryls or aralkyls, and X represents a moiety selected from the group consisting of —$SO_2$—, —CO—, $C_1$- to $C_6$-alkylenes, $C_2$- to $C_5$-alkylidenes and $C_6$- to $C_{12}$-arylenes, optionally condensed with further aromatic rings containing hetero atoms;

wherein the copolycarbonates have an inhomogeneity factor of: A) 1.3 to 2.5, when the copolycarbonates have a content of $\geq$50 mol % and <100 mol % of the at least one diphenol unit of the formula (2), based on total diphenols, and have an average molecular weight (weight-average) of 18,000 to 35,000 g/mol; and B) 1.2 to 2.4, when the copolycarbonates have a content of greater than 0 and less than 50 mol % of the at least one diphenol unit of the formula (2), based on total diphenols, and have an average molecular weight (weight-average) of 16,000 to 35,000 g/mol.

2. The copolycarbonates according to claim 1, wherein one of R1 and R2 represents a hydrogen and the other represents a tert-butyl substituent.

3. The copolycarbonates according to claim 1, wherein chain terminator structural unit of the formula (1) comprises a p-tert-butylphenol residue.

4. The copolycarbonates according to claim 1, wherein the at least one diphenol unit of the formula (2) comprises a 1,1-bis-(4-hydroxyphenyl)-3,3,5-trimethylcyclohexane residue.

5. The copolycarbonates according to claim 3, wherein the at least one diphenol unit of the formula (2) comprises a 1,1-bis-(4-hydroxyphenyl)-3,3,5-trimethylcyclohexane residue.

6. The copolycarbonates according to claim 1, wherein the copolycarbonates have an inhomogeneity factor of: A) 1.4 to 2.3, when the copolycarbonates have a content of $\geq$50 mol % and <100 mol % of the at least one diphenol unit of the formula (2), based on total diphenols, for linear copolycarbonates having an average molecular weight (weight-average) of 18,000 to 35,000 g/mol; and B) 1.2 to 2.0, when the copolycarbonates have a content of greater than 0 and less than 50 mol % of the at least one diphenol unit of the formula (2), based on total diphenols, for linear copolycarbonates having an average molecular weight (weight-average) of 16,000 to 35,000 g/mol.

7. The copolycarbonates according to claim 1, having a general structure according to the formula:

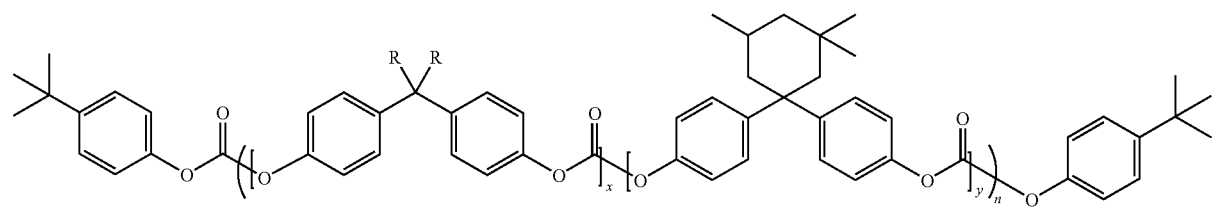

wherein each R independently represents a $C_1$-$C_4$-alkyl, x and y each independently represent a number of 0 to 1 and the sum of x+y=1, and n is determined by molecular weight of the copolycarbonates.

8. The copolycarbonates according to claim 7, wherein each R represents a methyl group, and x and y each independently represent a number of 0.02 to 0.98.

9. A composition comprising copolycarbonates according to claim 1 and at least one additive selected from the group consisting of heat stabilizers, mould release agents, UV stabilizers, and combinations thereof.

10. The composition according to claim 9, wherein the at least one additive comprises a compound selected from the group consisting of tris-(2,4-di-tert-butylphenyl) phosphite, tetrakis(2,4-di-tert-butylphenyl)[1,1-biphenyl]-4,4'-diyl-bis-phosphonite, trisoctylphosphate, octadecyl-3-(3,5-di-tert butyl-4-hydroxyphenyl)propionate, bis(2,4-dicumylphenyl) pentaerythritoldiphosphite, bis(2,6-di-tert.butyl-4-methylphenyl)penta-erythritoldiphosphite, triphenylphosphine, pentaerythritol tetrastearate, glycerol monostearate, stearyl stearate, propanediol mono- or distearate, 2-(2'-hydroxyphenyl)-benzotriazoles, 2-hydroxybenzophenones, esters of optionally substituted benzoic acids, acrylates, sterically hindered amines, oxamides, 2-(2-hydroxyphenyl)-1,3,5-triazines, and mixtures thereof.

11. A method comprising providing copolycarbonates according to claim 1, and processing the copolycarbonates to provide an article selected from the group consisting of moldings, extrudates, films, sheets and containers.

12. A method comprising providing a composition according to claim 9, and processing the composition to provide an article selected from the group consisting of moldings, extrudates, films, sheets and containers.

13. An article prepared by the method according to claim 11.

14. An article prepared by the method according to claim 12.

15. A process for preparing copolycarbonates according to claim 1, the process comprising:
(i) providing at least an alkylphenol of the general formula (1a)

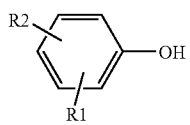

(1a)

wherein R1 and R2 each independently represent hydrogen or a $C_{1-18}$-alkyl, with the proviso that R1 and R2 are not simultaneously hydrogen, a diphenol of the general formula (2a)

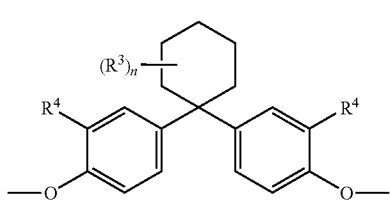

(2a)

wherein $R^3$ represents a $C_{1-4}$-alkyl, $R^4$ represents hydrogen or $C_1$-$C_4$-alkyl, and n represents 0, 1, 2 or 3; and at least one dihydroxyaryl compound of the formula (3)

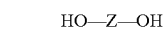

HO—Z—OH (3)

wherein Z represents a radical of the formula (3a)

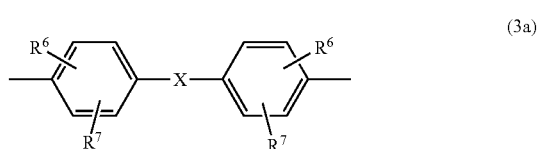

(3a)

wherein each $R^6$ and each $R^7$ independently represents a moiety selected from the group consisting of H, $C_1$-$C_{18}$-alkyls, $C_1$-$C_{18}$-alkoxys, halogens, optionally substituted aryls or aralkyls, and X represents a moiety selected from the group consisting of —$SO_2$—, —CO—, $C_1$- to $C_6$-alkylenes, $C_2$- to $C_5$-alkylidenes and $C_6$- to $C_{12}$-arylenes, optionally condensed with further aromatic rings containing hetero atoms; and (ii) reacting the alkylphenol, the diphenol and the dihydroxyaryl compound in a continuous interfacial reaction.

* * * * *